(12) United States Patent
Balk et al.

(10) Patent No.: US 6,624,207 B2
(45) Date of Patent: Sep. 23, 2003

(54) AQUEOUS POLYMER DISPERSION COMPRISING RUBBER PARTICLES AND POLYMER PARTICLES HAVING A REINFORCING ACTION

(75) Inventors: Roelof Balk, Boehl-Iggelheim (DE); Onno Graalmann, Dossenheim (DE); Bernhard van der Most, EL Zelhem (NL)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/006,710

(22) Filed: Dec. 10, 2001

(65) Prior Publication Data

US 2002/0120025 A1 Aug. 29, 2002

(30) Foreign Application Priority Data

Dec. 18, 2000 (DE) .......................... 100 63 160

(51) Int. Cl.⁷ ............... C08J 3/00; C08J 9/00
(52) U.S. Cl. ............ 521/70; 521/71; 524/458; 524/461; 524/502; 524/515; 524/525
(58) Field of Search ............ 521/70, 71; 524/458, 524/461, 502, 515, 525

(56) References Cited

U.S. PATENT DOCUMENTS

| | | |
|---|---|---|
| 3,296,178 A | 1/1967 | Sutherland, Jr. |
| 3,673,133 A | 6/1972 | Schmidt |
| 4,269,749 A | 5/1981 | Marriott et al. |
| 5,187,221 A | 2/1993 | Schlueter et al. |
| 5,925,704 A | 7/1999 | Sauer et al. |
| 6,051,616 A | 4/2000 | Balk et al. |

FOREIGN PATENT DOCUMENTS

| | | |
|---|---|---|
| CA | 961 588 | 1/1975 |
| DE | 10 56 364 | 10/1959 |
| DE | 21 50 872 | 4/1973 |
| DE | 197 57 700 | 6/1999 |
| EP | 0 187 905 | 7/1990 |
| EP | 0 753 530 | 1/1997 |
| GB | 808 964 | 2/1959 |
| GB | 1 396 757 | 6/1975 |

OTHER PUBLICATIONS

G. Kanig, Kolloid–Zeitschrift & Zeitschrift Fuer Polymere, vol. 190, No. 1, pps. 1–16, "Zur Theorie der Glastemperatur von Polymerhomologen, Copolymeren und Weichgemachten Polymeren", Jul. 1963.

T. G. Fox, American Physical Society, Series II, vol. 1, No. 1, p. 123, "J5. Influence of Diluent and of Copolymer Composition on the Glass Temperature of a Polymer System", Jan. 30, 1956.

Ullmann's Encyclopaedie der Technischen Chemie, vol. 19, p. 18, "Polyacryl– und Polymethacryl– Verbindungen", 1980.

Houben–Weyl, Methoden der Org. Chemie, vol. XIV/1, pps. 411–420, "Perlpolymerisation mit Hilfe von Dispergatoren", 1961.

Houben–Weyl, Methoden der Org. Chemie, vol. XIV/1, pps. 192–208, "Anionaktive Emulgatoren", 1961.

W. Maechtle, Analytical Ultracentrifugation in Biochemistry and Polymer Science, Royal Society of Chemistry, Chapter 10, pps. 147–175, "Analysis of Polymer Dispersions with an Eight–Cell–Auc–Multiplexer: High Resoultion Particle Size Distribution and Density Gradient Techniques", 1992.

W. Maechtle, Makromolekulare Chemie, vol. 185, pps. 1025–1039, "Charakterisierung von Dispersionen Durch Gekoppelte $H_2O/D_2O$–Ultrazentrifugenmessungen", 1984.

*Primary Examiner*—Jeffrey Mullis
(74) *Attorney, Agent, or Firm*—Oblon, Spivak, McClelland, Maier & Neustadt, P.C.

(57) ABSTRACT

An aqueous polymer dispersion comprises rubber particles and polymer particles having a reinforcing action.

16 Claims, No Drawings

AQUEOUS POLYMER DISPERSION COMPRISING RUBBER PARTICLES AND POLYMER PARTICLES HAVING A REINFORCING ACTION

BACKGROUND OF THE INVENTION

1. Field of the Invention

The present invention relates to an aqueous polymer dispersion comprising rubber particles and polymer particles having a reinforcing action, wherein the rubber particles are made up of x % by weight of an aromatic monovinyl compound and y % by weight of an aliphatic conjugated diene having from 4 to 9 carbon atoms in copolymerized form, and x is from 5 to 35 and y is from 65 to 95, and the polymer particles having a reinforcing action are made up of from 50 to 90% by weight of a first, hard polymer phase A and from 10 to 50% by weight of a second, soft polymer phase B, where the polymer phase A has a glass transition temperature above 70° C. and comprises from 90 to 100% by weight of an aromatic monovinyl compound and up to 10% by weight of an aliphatic conjugated diene having from 4 to 9 carbon atoms in copolymerized form and the polymer phase B comprises x±≦3% by weight of the aromatic monovinyl compound used in the rubber particles and y±≦3% by weight of the aliphatic conjugated diene having from 4 to 9 carbon atoms used in the rubber particles in copolymerized form.

The invention likewise relates to a process for preparing this polymer dispersion and to its use for producing latex foams and molded foam articles. In particular, the invention relates to the polymer particles having a reinforcing action used in the aqueous polymer dispersion and their preparation by means of free-radical-initiated aqueous emulsion polymerization.

2. Discussion of the Background

Latex foams and molded latex articles are produced according to the prior art from aqueous rubber dispersions by mechanical beating-in of air with addition of sulfur-crosslinking vulcanizers, gelled by addition of gelling agents and then vulcanized by heating to give a cellular, largely open-pored foam. The production of such latex foams and molded latex articles is described, for example, in DE-A 2150872 or DE-A 19757700. The rubber dispersions generally comprise reinforcing dispersions, i.e. aqueous dispersions of polymer particles having a reinforcing action. The type and amount of this reinforcing component have a strong influence on the property profile of the finished latex foam.

The latex foam is required to have a high elasticity, particularly in the use temperature range from 20 to 70° C., which must not be lost after prolonged compression and especially in continuous use. Accordingly, the compressive set (in accordance with ISO 1856) in this temperature range should be as small as possible and the recovery of the compressed molding should occur very quickly, i.e. the hysteresis (in accordance with DIN 53 577) should likewise be very small. Furthermore, the tensile strength and the maximum elongation to break (in accordance with ISO 1789) should be as high as possible. Likewise, the density of the foam should be as low as possible at a given indentation resistance of the foam (in accordance with ISO 2439A) so that the foam articles can be produced as economically as possible in respect of the amount of rubber dispersion which needs to be used.

Reinforcing polymer particles in the form of their aqueous polymer dispersion have been known for a long time for achieving a targeted increase in hardness, strength and elongation of latex foam. These are generally styrene/butadiene dispersions having a high styrene content up to 100% by weight. Reinforcing dispersions having a homogeneous structure, i.e. prepared in a single process step, have been described as disadvantageous in DE-A 1056364, since they do not meet the requirement for low compressive set values over a wide temperature range. According to this disclosure, better results are achieved by use of multistage grafted copolymer dispersions having a comparable overall composition which are prepared in a two-stage batch process. Such rubber dispersions and latex foam articles produced therefrom have a glass transition temperature of the reinforcing component which is within a relatively narrow temperature range in the stated interval from 20 to 70° C.

An embodiment of such a multiphase grafted copolymer dispersion which is improved in respect of significant points is described in EP-A 187 905. There, use is made, in particular, of semicontinuous feed stream addition processes to prepare polymer particles having different monomer compositions in the individual phases. The latex foams produced on the basis of these teachings have a balanced property combination with, in particular, low compressive set values in the entire temperature range from 20 to 70° C. The glass transition temperatures of the individual phases of the reinforcing component cover, according to this embodiment and in contrast to earlier teachings, a very wide range within the stated interval from 20 to 70° C. However, the moderate values of the fast elastic recovery of the latex foams produced according to these teachings, reflected in the relatively high hysteresis values, is not fully satisfactory.

EP-A 753 530 describes aqueous rubber dispersions comprising polymer particles having a reinforcing action which are said to comprise from 20 to 75% by weight of a hard polymer core, from 15 to 78% by weight of a soft outer phase and from 2 to 10% by weight of transition regions between these phases which have a copolymer composition between those of the hard and soft phases. It is important that the polymer particles having a reinforcing action are mixed in the form of their aqueous dispersion into the aqueous rubber dispersion only after the latter has been agglomerated.

Furthermore, it is known to those skilled in the art that the property profile of latex foams is generally improved in respect of the foam homogeneity if the agglomeration of the rubber dispersion is carried out in the presence of the polymer particles having a reinforcing action (coagglomeration). However, coagglomeration has hitherto been known only for freeze agglomeration (cf. U.S. Pat. No. 3,296,178, U.S. Pat. No. 3,673,133 and CA-B 961 588). However, freeze agglomeration requires a high outlay in terms of apparatus and has poor economics as a result of the high energy costs. Pressure agglomeration processes require far less outlay in terms of apparatus and are significantly cheaper. However, owing to rapid fouling and blocking of the apparatuses, pressure agglomeration processes cannot be used for the coagglomeration of rubber dispersions comprising the known reinforcing polymer particles.

SUMMARY OF THE INVENTION

It is an object of the present invention to provide polymer particles having a reinforcing action for foamable rubber dispersions, which particles can be coagglomerated with the rubber dispersions by means of a pressure agglomeration process and make it possible to produce latex foams which have a property profile comparable to or better than the prior art.

We have found that this object is achieved by the above-described aqueous polymer dispersion, a process for preparing it and its use for producing latex foams and molded foam articles.

DESCRIPTION OF THE PREFERRED EMBODIMENTS

The rubber particles present in the aqueous polymer dispersion comprise x % by weight of an aromatic monovinyl compound and y % by weight of an aliphatic conjugated diene having from 4 to 9 carbon atoms in copolymerized form.

Here, x is from 5 to 35, often from 10 to 30 and all values between these. x is frequently $\geq 7$, $\geq 9$, $\geq 11$, $\geq 13$, $\geq 15$, $\geq 17$, $\geq 19$, $\geq 21$, $\geq 23$ and $\leq 33$, $\leq 31$, $\leq 29$, $\leq 27$, $\leq 25$, $\leq 23$, $\leq 9$.

For the purposes of the present inventon, aromatic monovinyl compounds are monomers of the formula $CH_2=CR^1R^2$, where $R^1$ is an aromatic unit having from 6 to 10 carbon atoms which may also bear further alkyl radicals and/or halogen substituents. $R^2$ is hydrogen or an alkyl radical having from 1 to 4 carbon atoms. Preferred aromatic monovinyl compounds are, for reasons of economics and availability, styrene, α-methylstyrene and vinyltoluene, with particular preference being given to styrene. Of course, it is also possible to use mixtures of various aromatic monovinyl compounds.

According to the present inventions, y is from 65 to 95, often from 70 to 90 and all values between these. y is frequently $\geq 67$, $\geq 69$, $\geq 71$, $\geq 73$, $\geq 75$, $\geq 77$, $\geq 79$ and $\leq 93$, $\leq 91$, $\leq 89$, $\leq \leq 85$, $\leq 83$, $\leq 81$, $\leq 79$, $\leq 77$.

Suitable aliphatic conjugated dienes having from 4 to 9 carbon atoms are 1,3-butadiene and substituted butadienes, for example 2-chloro- or 2-methyl-1,3-butadiene. Further suitable dienes are conjugated, straight-chain and branched pentadienes and hexadienes and also further straight-chain or branched conjugated dienes having up to 9 carbon atoms. Of course, it is also possible to use mixtures of various aliphatic dienes. For reasons of economics and the advantageous properties in copolymers, 1,3-butadiene is particularly preferred.

Further olefinically unsaturated, copolymerizable monomers such as acrylates and methacrylates, for example methyl methacrylate, $C_3$–$C_5$-monocarboxylic and $C_4$–$C_8$-dicarboxylic acids and their water-soluble salts, e.g. acrylic acid, methacrylic acid, maleic acid, fumaric acid, itaconic acid and their alkali metal and ammonium salts, or crosslinking monomers, for example the diesters of dihydric alcohols, e.g. alkylene glycol diacrylates and dimethacrylates and also divinylbenzene, vinyl methacrylate, vinyl acrylate, allyl methacrylate, allyl acrylate, diallyl maleate, diallyl fumarate or cyclopentadienyl acrylate, and the $C_1$–$C_8$-hydroxyalkyl esters of methacrylic acid and acrylic acid can likewise be present in the rubber polymer if required. However, the sum of these monomers in copolymerized form, based on the total amount of rubber polymer, is $\leq 10\%$ by weight, often $\leq 5\%$ by weight and in particular $\leq 2\%$ by weight.

The sum of x and y is therefore $\geq 90$, often $\geq 95$ or $\geq 98$ and frequently 100.

The polymer particles having a reinforcing action are made up of from 50 to 90% by weight, preferably from 60 to 80% by weight, of a first, hard polymer phase A and from 10 to 50% by weight, preferably from 20 to 40% by weight, of a second, soft polymer phase B.

It is important that the polymer phase A has a glass transition temperature above 70° C., preferably $\geq 90°$ C., and comprises from 90 to 100% by weight of an aromatic monovinyl compound, in particular styrene, and up to 10% by weight of an aliphatic conjugated diene having from 4 to 9 carbon atoms, in particular 1,3-butadiene, in copolymerized form. However, it should be noted that the abovementioned further copolymerizable monomers may optionally be present in copolymerized form in addition to the conjugated aliphatic diene.

For the present purposes, the glass transition temperature ($T_g$) is the limit to which the glass transition temperature tends as the molecular weight increases, as described by G. Kanig (Kolloid-Zeitschrift & Zeitschrift für Polymere, Vol. 190, page 1, equation 1). The glass transition temperature is determined by the DSC method (Differential Scanning Calorimetry, 20 K/min, midpoint measurement, DIN 53 765).

According to Fox (T. G. Fox, Bull. Am. Phys. Soc. 1956 [Ser. II] 1, page 123, and Ullmann's Encyclopädie der technischen Chemie, Vol. 19, page 18, 4th edition, Verlag Chemie, Weinheim, 1980), the glass transition temperature of at most weakly crosslinked copolymers obeys, to a good approximation, the following equation:

$$1/T_g = x^1/T_g^1 + x^2/T_g^2 + \ldots x^n/T_g^n,$$

where $x^1, x^2, \ldots x^n$ are the mass fractions of the monomers 1, 2, ... n and $T_g^1, T_g^2, \ldots T_g^n$ are the glass transition temperatures in degrees Kelvin of the polymers made up in each case of only one of the monomers 1, 2, ... n. The $T_g$-values of the homopolymers of most monomers are known and are reported, for example, in Ullmann's Ecyclopedia of Industrial Chemistry, 5th edition, Vol. A21, page 169, Verlag Chemie, Weinheim, 1992; further sources of glass transition temperatures of homopolymers are, for example, J. Brandrup, E. H. Immergut, Polymer Handbook, 1st Ed., J. Wiley, New York, 1966; 2nd Ed. J. Wiley, New York, 1975, and 3rd Ed., J. Wiley, New York, 1989.

The polymer phase B comprises x±$\leq 3\%$ by weight of the aromatic monovinyl compound used in the rubber particles and y±$\leq 3\%$ by weight of the aliphatic conjugated diene having from 4 to 9 carbon atoms used in the rubber particles in copolymerized form.

It is important for the purposes of the present invention that the polymer composition of the polymer phase B and the polymer composition of the rubber particles, or in the case of their possible stage polymers, that of the outer polymer phase or that of the softer polymer phase, are very similar or even identical. For this reason, the deviation of the polymer composition of the polymer phase B from the polymer composition of the rubber particles, based on the content x of aromatic monovinyl compound and the content y of aliphatic conjugated diene in copolymerized form, is often $\pm \leq 2.5\%$ by weight, $\pm \leq 2.0\%$ by weight, frequently $\pm \leq 1.5\%$ by weight, $+ \leq 1.0\%$ by weight or even $\pm \leq 0.5\%$ by weight. The rubber particles and the polymer phase B advantageously have the same composition. If representatives of the abovementioned further ethylenically unsaturated monomers are additionally present in copolymerized form in the rubber particles in addition to the aromatic monovinyl compound and the aliphatic conjugated diene, it is therefore advantageous for these also to be copolymerized in the corresponding amounts into the polymer phase B.

The rubber particles are prepared by free-radical aqueous emulsion polymerization using customary processes including feed stream addition processes, semicontinuous feed stream addition processes and batch processes. Preference is given to a semicontinuous process in which the monomers in pure or preemulsified form are placed together with the polymerization medium and at least one emulsifier in a reactor and are polymerized, preferably without prior formation of a seed latex, with addition of a free-radical initiator. Part of the free-radical initiator can also be included in the initial charge or all of it can be introduced into the polymerization reactor via a feed stream at a rate corresponding to that at which it is consumed so as to maintain the polymerization.

As monomers, from 5 to 35% by weight, often 10 and 30% by weight and all values between these, of at least one of the abovementioned aromatic monovinyl compounds, preferably styrene, and from 65 to 95% by weight, often from 70 to 90% by weight and all values between these, of at least one of the abovementioned aliphatic conjugated dienes, preferably 1,3-butadiene, are used in the aqueous emulsion polymerization. At this point, it may be pointed out that the percentages specified in this description for the aromatic monovinyl compounds, aliphatic conjugated dienes and any further olefinically unsaturated monomers present in copolymerized form in the polymers of the rubber particles and the polymer phases A and B of the polymer particles having a reinforcing action generally correspond to the contents of these monomers in the monomer mixtures to be polymerized and vice versa.

The polymerization medium can consist of only water or of mixtures of water and water-miscible liquids, e.g. methanol. Preference is given to using only water.

The free-radical aqueous emulsion polymerization can be carried out at atmospheric pressure, under superatmospheric pressure or under reduced pressure. Particularly when using gaseous monomers, e.g. 1,3-butadiene, the polymerization can be carried out under superatmospheric pressure.

The polymerization temperature is generally from 0 to 100° C. Higher polymerization temperatures, e.g. up to 130° C., are possible. However, the polymerization temperature is preferably at lower values of from about 0 to 50° C., preferably from about 0 to 30° C.

To prepare the dispersion of rubber particles, emulsifiers and/or protective colloids are added to the polymerization batch in an amount of from 0.05 to 15% by weight, preferably from 1 to 10% by weight, based on the total amount of monomers.

Suitable emulsifiers are the emulsifiers which are known to those skilled in the art and are customarily used as dispersants in aqueous emulsion polymerization, as are described, for example, in Houben-Weyl, Methoden der organischen Chemie, Volume XIV/1, Makromolekulare Stoffe, pages 411 to 420, Georg-Thieme-Verlag, Stuttgart, 1961. Anionic, cationic and nonionic emulsifiers are all suitable. Preference is given to using anionic emulsifiers, in particular soaps.

Suitable anionic emulsifiers are the salts of $C_8$–$C_{18}$-fatty acids with alkali metals such as sodium and potassium, with ammonium, volatile amines such as triethylamine, ethanolamine, diethanolamine, triethanolamine, morpholine, etc., and with divalent and trivalent cations, e.g. calcium, magnesium, aluminum, etc. Further suitable anionic emulsifiers are, for example, alkali metal and ammonium salts of alkyl sulfates (alkyl radical: $C_8$–$C_{22}$), of sulfuric monoesters of ethoxylated alkanols (number of EO units: from 2 to 50, alkyl radical: $C_{12}$–$C_{18}$) and ethoxylated alkylphenols (number of EO units: from 3 to 50, alkyl radical: $C_4$–$C_9$), of alkylsulfonic acids (alkyl radical: $C_{12}$–$C_{18}$) and of alkylarylsulfonic acids (alkyl radical: $C_9$–$C_{18}$). Further suitable emulsifiers are indicated in Houben-Weyl, Methoden der organischen Chemie, Volume XIV/1, Makromolekulare Stoffe, pages 192 to 208, Georg-Thieme-Verlag, Stuttgart, 1961. Further suitable anionic emulsifiers are bis(phenoylsulfonic acid) ethers or their alkali metal or ammonium salts, which bear a $C_4$–$C_{24}$-alkyl group on one or both aromatic rings. These compounds are generally known, e.g. from U.S. Pat. No. 4,269,749, and are commercially available, for example as Dowfax® 2A1 (Dow Chemical Company).

Preferred emulsifiers are the sodium or potassium soaps of palmitic acid, margaric acid, stearic acid, palmitoleic acid and oleic acid and the resin soaps (resinates), e.g. sodium or potassium salts of ricinoleic acid, abietic acid, pimaric acid, etc.

To achieve sufficient coverage of the particles, the amount of soaps used as emulsifiers is generally from about 1 to 10% by weight, based on the total amount of monomers to be polymerized.

Suitable protective colloids are the customary protective colloids which are stable at the preferably alkaline pH values of the dispersions of rubber particles. A comprehensive description of protective colloids is given in Houben-Weyl, Methoden der organischen Chemie, Volume XIV/1, Makromolekulare Stoffe, pages 411 to 420, Georg-Thieme-Verlag, Stuttgart, 1961. Suitable protective colloids are phenol-formaldehyde and naphthalenesulfonic acid-formaldehyde condensates, for example the Tamol® grades from BASF AG. The amount used is generally from about 0.1 to 2% by weight, based on the total amount of monomers to be polymerized.

As free-radical initiators, it is possible to use all compounds which decompose into free radicals under the polymerization conditions, e.g. peroxides, hydroperoxides, hydrogen peroxide, persulfates, azo compounds and redox catalysts. Preference is given to using water-soluble free-radical initiators. In some cases it is advantageous to use mixtures of various polymerization initiators, e.g. mixtures of hydrogen peroxide and sodium or potassium peroxodisulfate. Mixtures of hydrogen peroxide and sodium peroxodisulfate can be used in any ratio. Organic peroxides which are likewise suitable as free-radical initiators are described in EP-A 536 597. The free-radical initiators mentioned are used in customary amounts, e.g. in amounts of from 0.01 to 5% by weight, preferably from 0.1 to 3.0% by weight, based on the total amount of monomers to be polymerized.

Preference is given to using free-radical initiators which make initiation of the polymerization possible even at low temperatures, for example from about 0 to 50° C., preferably from about 10 to 30° C. Polymerizations, especially at low temperatures, are preferably carried out using redox initiators comprising at least one reducing agent and one oxidizing agent. Suitable oxidizing agents are the abovementioned peroxides and/or hydroperoxides. Preference is given to combined systems which may further comprise a small amount of a metal compound which can exist in a plurality of oxidation states and is soluble in the polymerization medium. Suitable redox initiator systems for the process of the present invention comprise as reducing component, for example, ascorbic acid, glucose, sorbose, ammonium or alkali metal hydrogensulfite, sulfite, thiosulfate, hyposulfite, pyrosulfite or sulfide, salts of hydroxymethanesulfinic acid, preferably the sodium salt, obtainable as Rongalit® from BASF AG and also acetone-bisulfite adducts, etc.

Suitable oxidizing components are hydrogen peroxide, t-butyl hydroperoxide, diisopropylphenyl hydroperoxide (DIHP), ammonium and/or alkali metal peroxodisulfates, etc. Suitable metallic components are water-soluble Fe(II) salts, e.g. iron(II) sulfate, silver salts, combinations of water-soluble Fe/V salts, etc.

Preferred redox initiators are:

DIHP/acetone-bisulfite adduct,

DIHP/hydroxymethanesulfinic acid sodium salt, ascorbic acid/iron(II) sulfate/hydrogen peroxide.

If redox initiators are used as initiator systems, the amount of reducing component is generally from about $3 \times 10^{-6}$ to 1 mol % and the amount of the oxidizing component is generally from about 0.001 to 5.0 mol %, based on the total amount of monomers used in the polymerization.

The polymer solids content of the resulting aqueous dispersion of rubber particles is usually from 10 to 70% by weight, in particular from 20 to 60% by weight.

The rubber particles generally have a weight average particle diameter of from 30 to 120 nm, preferably from 40 to 100 nm. For the purposes of the present text, the weight average particle diameter is the $d_{50}$ so value obtainable from a determination by means of an analytical ultracentrifuge (cf. S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell-AUC-Multiplexer: High Resolution Particle Size Distribution and Density Gradient Techniques, W. Mächtle, pages 147 to 175).

The polymer particles having a reinforcing action are prepared by a two-stage free-radical-initiated aqueous emulsion polymerization. For the polymerization of the hard polymer phase A, the necessary amount of monomer mixture A is added in a feed stream addition process and emulsified in the aqueous phase with continual vigorous stirring. Appropriate amounts of free-radical initiator and emulsifier are likewise added in a feed stream addition process in order to start the emulsion polymerization. The monomer mixture A and the emulsifier can likewise be added as an aqueous emulsion. As an alternative, part of the monomer mixture A together with a matched proportion of free-radical initiator and emulsifier can be initially charged and polymerized in a batch reaction. The remaining amounts of monomer mixture A, emulsifier and free-radical initiator are then metered in as feed streams. The amounts of free-radical initiator, emulsifier and monomer mixture A are matched to one another in a manner known to those skilled in the art so that the number average particle diameter is from 50 to 200 nm, preferably from 80 to 150 nm. Here, the number average particle diameter of the polymer particles is the particle diameter determined on a 0.005 to 0.01 percent strength by weight aqueous dispersion by dynamic light scattering. The value reported is the mean diameter of the cumulative evaluation (cumulant z-average) of the measured autocorrelation function.

It is important that a monomer conversion of $\geq 98\%$, preferably $\geq 98.5\%$ and particular preferably $\geq 99\%$, is achieved at the end of this first reaction stage by means of appropriate choice of reaction conditions, for example reaction temperature, reaction pressure and reaction time, feed times of the monomer mixture A and the free-radical initiator, etc.

The polymerization of the soft polymer phase B is carried out in the presence of the polymer phase A. For this purpose, $x \pm \leq 3\%$ by weight of the aromatic monovinyl compound or compounds used for preparing the rubber particles and $y \pm \leq 3\%$ by weight of the aliphatic conjugated diene or dienes used for preparing the rubber particles and any further olefinically unsaturated monomers are added, separately or in admixture, all at once or in individual portions, to the aqueous dispersion of the polymer phase A or, in a preferred embodiment, are metered in in a feed stream addition process. Free-radical initiator and emulsifier are preferably added or metered in in such a way that no formation of new particles takes place during this addition. Rather, efforts are made to ensure that the polymer phase B deposits on the existing particles of the polymer phase A and these particles grow further to a number average diameter of from 100 to 250 nm, preferably from 120 to 200 nm. The polymerization of the polymer phase B is carried out so that the total conversion of the monomers at the end of the polymerization is at least 95%, preferably more than 98%.

To stabilize the reinforcing dispersions of the present invention, use is made of the customary fatty acid soaps and/or resin soaps which lead to polymer dispersions having an increased pH of from 8 to 11. Corresponding to the alkalinity of these emulsifiers, the polymerization also takes place at these pH values. The emulsifier content is from 0.5 to 10% by weight, preferably from 2 to 5% by weight, in each case based on the total amount of monomer mixture A and B.

From 0.01 to 5% by weight, preferably from 0.05 to 3% by weight, of free-radical initiators, based on the total amount of the monomer mixtures A and B, are used for the polymerization. Suitable free-radical initiators are oil- and/or water-soluble azo initiators, peroxides, hydroperoxides and peroxodisulfates. In polymerization at elevated temperatures, preference is given to using peroxodisulfates. If, on the other hand, the polymerization is carried out at low temperature, preference is given to using peroxides and hydroperoxides in combination with a reducing agent. Suitable reducing agents are, for example, sodium bisulfite, ascorbic acid and sodium formaldehyde-sulfoxylate, preferably in combination with metal salts, in particular an iron (II/III) salt. The polymerization temperature depends on the initiator system and is from 0 to 100° C., preferably from 60 to 95° C., when using a peroxodisulfate as initiator and is preferably from 10 to 70° C. when using a redox initiator system.

Furthermore, chain transfer agents can be used for regulating the molecular weight and the degree of crosslinking. Preferred chain transfer agents are, in particular, aliphatic, straight-chain or branched mercaptans in an amount of from 0.05 to 2% by weight, based on the total amount of the monomer mixtures A and B.

The polymer solids content of the reinforcing dispersion according to the present invention is from 30 to 70% by weight, preferably from 40 to 60% by weight. The number average particle diameter at the end of the polymerization is from 100 to 250 nm, preferably from 120 to 200 nm.

It may be necessary to free the aqueous dispersion of the rubber particles and/or the polymer particles having a reinforcing action of significant quantities of odor-imparting substances, e.g. residual monomers and other volatile organic constituents, after the polymerization. This can be achieved by physical means in a manner known per se by distillation (in particular steam distillation) or by stripping with an inert gas (for example nitrogen). The residual monomer content can also be reduced chemically by means of a free-radical after-polymerization with which those skilled in the art are familiar, in particular in the presence of redox initiator systems.

To prepare the aqueous polymer dispersion of the present invention, the aqueous dispersion of the rubber particles and the aqueous dispersion of the polymer particles having a reinforcing action are combined and homogeneously mixed. Here, the ratios of the two dispersions are selected so that from 1 to 40 parts by weight, preferably from 10 to 30 parts by weight, of polymer particles having a reinforcing action are present per 100 parts by weight of rubber particles in the combined aqueous polymer dispersion.

The resulting aqueous polymer dispersion is then subjected to a subsequent agglomeration step, for example by means of chemical agglomeration, freeze agglomeration or, in particular, pressure agglomeration, as are well known to those skilled in the art. The agglomeration step results in the fine rubber particles coagglomerating with the polymer particles having a reinforcing action to form coarser particles.

The weight average particle diameter $d_{50}$ of the coagglomerated polymer particles is generally from 80 to 2 000 nm, preferably from 100 to 1 500 nm.

During or after the agglomeration step, the aqueous dispersion of the coagglomerated particles is concentrated by measures known to those skilled in the art to polymer solids contents of $\geq 60\%$ by weight, preferably $\geq 65\%$ by weight.

The resulting aqueous dispersion of coagglomerated particles is then foamed together with the customary processing aids and further additives with beating in of air or inert gases, for example nitrogen, and subsequently vulcanized. As further additives, it is possible to add, in particular, further stabilizers such as fatty acid soaps and/or resin soaps, aging inhibitors and light stabilizers, thickeners and organic and/or inorganic fillers (for example chalk or starch). Such foams can advantageously be used for backing textile floor coverings and for producing molded foam articles of all types and in particular for producing latex mattresses. In these articles, the foam produced from the dispersions of the present invention displays a balanced combination of the properties hardness, compressive set, strength and elongation. It is particularly advantageous that the polymer dispersion of the present invention can be agglomerated by means of the inexpensive pressure agglomeration process without troublesome deposits or blocking of the pressure slit occurring.

It is worth noting that the present invention also encompasses aqueous polymer dispersions whose rubber particles prepared in aqueous dispersion in a separate step are firstly agglomerated by means of one of the known methods and the aqueous dispersion of the polymer particles having a reinforcing action and the agglomerated rubber particles present in an aqueous medium are subsequently mixed with one another. Of course, it is also possible to concentrate each of the two dispersions separately prior to mixing or together after mixing.

The invention is illustrated by the nonlimiting examples below.

EXAMPLES

Analytical Methods

The weight average particle diameters ($d_{50}$) were determined in an analytical ultracentrifuge (AUC) using the method of W. Mächtle, Makromolekulare Chemie 185, 1984, pages 1025 to 1039.

The number average particle diameters of the polymer particles were determined on a 0.005 to 0.01% strength by weight aqueous dispersion by dynamic light scattering at 23° C. by means of an Autosizer IIC from Malvern Instruments, UK. The value reported is the mean diameter of the cumulative evaluation (cumulant z-average) of the measured autocorrelation function (ISO Standard 13 321).

The solids contents were determined by drying an aliquot of the aqueous polymer dispersion to constant weight at 140° C. in a drying oven. Two separate measurements were carried out in each case. The value reported in the examples is the mean of the two measurements.

The density of the foams produced from the polymer dispersions was determined in accordance with ISO 845.

The hardness of the foams produced from the polymer dispersions was determined as indentation resistance in accordance with ISO 2439A, corresponding to 40% indentation for 30 seconds.

The ultimate tensile strength and the elongation at break were determined in accordance with ISO 1798.

The compressive set was determined in accordance with ISO 1856.

The fatigue was determined in accordance with ISO 3385.

A) Preparation of a Finely-Divided Polymer Dispersion A of Rubber Particles

A solution of 0.18 kg of $K_2SO_4$, 0.11 kg of $Na_2SO_4$, 0.007 kg of the sodium salt of ethylenediaminetetraacetic acid (EDTA-Na), 0.007 kg of sodium dithionite, 0.17 kg of a 45% strength by weight solution of a polycondensate of naphthalenesulfonic acid and formaldehyde having a number average molecular weight of 5 000 in deionized water, 7.9 kg of a 12.5% by weight solution of potassium oleate in deionized water and 9.0 kg of deionized water were placed in a stirred, pressure-rated polymerization vessel having a capacity of 160 l while stirring at 20–25° C. (room temperature). A further 46.8 kg of deionized water were subsequently added. The following constituents of a redox initiator system were then added: 0.007 kg of sodium thionite, 0.007 kg of sodium formaldehyde-sulfoxylate, 0.003 kg of $Fe(II)SO_4$ x 7 $H_2O$, 0.007 kg of EDTA-Na, 0.013 kg of sodium phosphate ($Na_3PO_4$ x 10 $H_2O$) and 2.5 kg of deionized water. 8.4 kg of styrene and 0.03 kg of t-dodecyl mercaptan were then stirred in. Finally, 25.1 kg of 1,3-butadiene were passed into the polymerization vessel. The resulting mixture was cooled to 10° C. while stirring. 0.05 kg of para-menthane hydroperoxide were then added all at once, thus triggering the polymerization. While maintaining the polymerization temperature of 10° C., polymerization was continued to a polymerization conversion of 35% by weight, based on the total amount of monomers to be polymerized. Subsequently, 1.3 kg of a 12.5% by weight solution of potassium oleate in deionized water and 0.02 kg of para-menthane hydroperoxide were added all at once while stirring. The polymerization was then continued to a polymerization conversion of 90% by weight while maintaining the temperature at 10° C. Finally, the free-radical aqueous emulsion polymerization was stopped by addition of 0.012 kg of diethylhydroxylamine. The residual monomers were subsequently removed by heating the aqueous polymer dispersion at 60° C. for 2 hours while evacuating the polymerization vessel [to a pressure of at least 400 mbar (absolute)], subsequently pressurizing the vessel with nitrogen to 4 bar (absolute) and repeating this procedure about eight times over a period of 20 hours. The aqueous polymer dispersion A had a residual 1,3-butadiene content of 49 ppm, a solids content of 37.1% by weight and the polymer particles had a weight average particle diameter $d_{50}$ of 50 nm.

B) Preparation of an Aqueous Polymer Dispersion B of Polymer Particles Having a Reinforcing Action A high-pressure stirred vessel having a nominal capacity of 160 l was charged at room temperature under a nitrogen atmosphere with

| | |
|---|---|
| 28.00 kg | of deionized water, |
| 2.50 kg | of a 34% strength by weight aqueous polystyrene latex having a weight average particle diameter $d_{50}$ of 30 nm, |
| 0.054 kg | of EDTA-Na and |
| 0.73 kg | of feed stream 3 | and heated to 80° C. while stirring. When the temperature had reached 75° C., the introduction of feed stream 1 and the remainder of feed stream 3 was commenced simultaneously. Feed stream 1 was metered in over a period of 2 hours and the remainder of feed stream 3 was metered in over a period of 5 hours. 30 minutes after all of feed stream 1 had been added, the introduction of feed stream 2 was commenced and this was metered in over a period of 2 hours. When the introduction of feed stream 2 was commenced, the temperature regulator was set to 90° C.

After all of feed stream 3 had been added, polymerization was continued for three quarters of an hour at 90° C. After addition of 0.62 g of EDTA-FeNa, introduction of feed streams 4 and 5 was commenced simultaneously and these were metered in in parallel over a period of 2 hours. The reaction mixture was subsequently cooled to 60° C. and volatile constituents were removed by stripping with 4 bar steam for three hours. The aqueous polymer dispersion was subsequently cooled to room temperature and filtered through a 200 μm filter.

Feed stream 1

| | |
|---|---|
| 38.50 kg | of styrene |
| 6.50 kg | of deionized water |
| 0.14 kg | of a 46% strength by weight solution of potassium hydroxide in deionized water |
| 4.75 kg | of a 17.4% strength by weight solution of potassium oleate in deionized water |
| 0.79 kg | of a 3% strength by weight solution of sodium pyrophosphate in deionized water |

Feed stream 2

| | |
|---|---|
| 4.13 kg | of styrene |
| 12.38 kg | of 1,3-butadiene |
| 0.02 kg | of t-dodecyl mercaptan |
| 6.50 kg | of deionized water |
| 0.14 kg | of a 46% strength by weight solution of potassium hydroxide in deionized water |
| 4.75 kg | of a 17.4% strength by weight solution of potassium oleate in deionized water |
| 0.79 kg | of a 3% strength by weight solution of sodium pyrophosphate in deionized water |

Feed stream 3

| | |
|---|---|
| 2.70 kg | of deionized water |
| 0.22 kg | of sodium peroxodisulfate |

Feed stream 4

| | |
|---|---|
| 1.00 kg | of deionized water |
| 0.12 kg | of a 70% strength by weight solution of t-butyl hydroperoxide in deionized water |

Feed stream 5

| | |
|---|---|
| 0.45 kg | of deionized water |
| 0.04 kg | of a 79% strength by weight solution of sodium formaldehyde-sulfoxylate in deionized water (Rongalit ® C from BASF AG) |

The aqueous polymer dispersion B had a solids content of 50.8% and the polymer particles had a number average particle diameter of 158 nm.

C) Preparation of an Aqueous Polymer Dispersion C (Comparative Dispersion)

A high-pressure stirred vessel having a nominal capacity of 160 l was charged at room temperature under a nitrogen atmosphere with

| | |
|---|---|
| 31.00 kg | of deionized water, |
| 2.55 kg | of a 32% strength by weight aqueous polystyrene latex having a weight average particle diameter $d_{50}$ of 30 nm, |
| 0.054 kg | of EDTA-Na and |
| 0.77 kg | of feed stream 2 | and the mixture was heated to 80° C. while stirring. When the temperature had reached 75° C., the introduction of feed stream 1 and the remainder of feed stream 2 was commenced simultaneously. Feed stream 1 was metered in over a period of 4 hours and the remainder of feed stream 2 was metered in over a period of 4.5 hours. Subsequently, polymerization was continued for 30 minutes.

After addition of 0.62 g of EDTA-FeNa, the introduction of feed streams 3 and 4 was commenced simultaneously and these were metered in in parallel over a period of 2 hours. The reaction mixture was subsequently cooled to 60° C. and volatile constituents were removed by stripping with 4 bar steam for three hours. The aqueous polymer dispersion was subsequently cooled to room temperature and filtered through a 200 μm filter.

Feed stream 1

| | |
|---|---|
| 55.00 kg | of styrene |
| 14.00 kg | of deionized water |
| 1.10 kg | of a 10% strength by weight solution of potassium hydroxide in deionized water |
| 2.47 kg | of a 17.4% strength by weight solution of potassium oleate in deionized water |
| 6.40 kg | of a 45% strength by weight solution of a condensate of naphthalenesulfonic acid and formaldehyde in deionized water (Tamol ® NN 4501 from BASF AG) |
| 1.58 kg | of a 3% strength by weight solution of sodium pyrophosphate in deionized water |

Feed stream 2

| | |
|---|---|
| 2.90 kg | of deionized water |
| 0.17 kg | of sodium peroxodisulfate |

Feed stream 3

| | |
|---|---|
| 0.70 kg | of deionized water |
| 0.12 kg | of a 70% strength by weight solution of t-butyl hydroperoxide in deionized water |

Feed stream 4

| | |
|---|---|
| 0.47 kg | of deionized water |
| 0.04 kg | of a 79% strength by weight solution of sodium formaldehyde-sulfoxylate in deionized water |

The aqueous polymer dispersion C had a solids content of 50.0% and the polymer particles had a number average particle diameter of 155 nm.

D) Carrying out the Pressure Coagglomeration According to the Present Invention 8 720 g of the rubber dispersion A and 1 280 g of the aqueous reinforcing dispersion B were mixed homogeneously and subjected to a pressure coagglomeration at 21° C., a pressure of 220 bar and a throughput of 60 liters per hour (apparatus: high-pressure pump LAB 60-10 TBS from APV Gaulin GmbH; maintenance of a constant pressure by means of a variable slit). The aqueous polymer dispersion had a weight average particle diameter $d_{50}$ of 670 nm.

The pressure-coagglomerated aqueous polymer dispersion was concentrated by means of a thin film evaporator.

The wall temperature of the evaporator was 100–130° C. at a pressure in the evaporation chamber of 80–120 mbar (absolute).

The concentration step gave an aqueous polymer dispersion I having a solids content of 70.7% and a Brookfield viscosity of 2 160 mPas.

E) Pressure Homoagglomeration and Subsequent Mixing-in of the Polymer Dispersions Having a Reinforcing Action The aqueous rubber dispersion A was agglomerated and concentrated under the conditions described in D). This gave an aqueous polymer dispersion E having a solids content of 72.0% and a Brookfield viscosity of 1 500 mPas. The weight average particle diameter $d_{50}$ was 580 nm.

A polymer dispersion II was prepared by homogeneously mixing 5 000 g of the aqueous polymer dispersion E, 78 g of a 17.4% strength by weight solution of potassium oleate in deionized water and 1 064 g of the aqueous polymer dispersion B at room temperature.

A polymer dispersion III was prepared by homogeneously mixing 5 000 g of the aqueous polymer dispersion E, 104 g of a 17.4% strength by weight solution of potassium oleate in deionized water and 684 g of the aqueous comparative dispersion C at room temperature.

F) Production of a Polymer Foam

| | |
|---|---|
| 22.5 g | of sulfur powder (grade VU 503 from Synthomer GmbH, Germany) |
| 20 g | of zinc ethylphenyldithiocarbamate, |
| 15 g | of diphenylguanidine, |
| 10 g | of antioxidant based on sterically hindered phenols (Wingstay ® L from Goodyear) and |
| 30 g | of finely divided zinc(II) oxide (grade Weiβsiegel from Mercura Chemical GmbH, Germany), | each in the form of a 50% strength by weight aqueous suspension, were successively stirred into each of the aqueous polymer dispersions I, II and III obtained above, in each case based on 1 000 g of solids.

The resulting mixture was prefoamed by means of a mechanical foamer to from 9 to 10 times its original volume. 120 g of a 25% strength by weight suspension of $Na_2SiF_6$ in deionized water were incorporated into the foam over a period of 2 minutes.

The mechanically blown mass was subsequently introduced into a metal mold (350×330×50 mm) and the excess foam was struck off level (foam slab). The mold was allowed to stand for 10 minutes at room temperature, during which time the foamed mass gelled. To vulcanize the foam, the mold was subsequently placed for 30 minutes in a vulcanization oven heated by means of 100° C. steam.

In a further experiment, the mechanically blown mass was introduced into a small, closed mattress mold (350×390×100 mm) heated to 50° C. The closed mattress mold was provided with internals so that the foam mattress had an apparent density corresponding to about 60% of the density of the foam slab. To gel and vulcanize the foamed mass, the mold was subsequently placed for 45 minutes in a vulcanization oven heated by means of 100° C. steam.

The resulting foam rubber bodies were then taken from the molds, washed with deionized water, dried at 80° C. for 8 hours and conditioned in accordance with DIN-ISO 471. The resulting foams had the properties listed in the following table:

| Polymer dispersion | | | | I | II | III |
|---|---|---|---|---|---|---|
| Foam slab | Density | | g/l | 107 | 100 | 101 |
| | Hardness | | N | 250 | 250 | 245 |
| | Breaking stress | | kPa | 155 | 130 | 96 |
| | Elongation at break | | % | 280 | 275 | 215 |
| | Compressive set | | % | 10 | 13 | 15 |
| Mattress | Standardized hardness[1] | | N | 122 | 134 | 119 |
| | Fatigue[2] | after 0 h | ΔH | % | 11 | 20 | 17 |
| | | | Δh | % | 3 | 3 | 2 |
| | | after 24 h | ΔH | % | 0 | 12 | 10 |
| | | | Δh | % | 1 | 2 | 1 |

[1] Hardness standardized to a density of 60 g/liter
[2] ΔH = Decrease in hardness, Δh = Decrease in thickness It can be seen from the table that the latex foam obtained from the polymer dispersion I via the pressure coagglomeration step and the latex foam obtained from the polymer dispersion II after pressure homoagglomeration and subsequent mixing in of the reinforcing dispersion according to the present invention is superior to the latex foam obtained from the comparative dispersion III, specially in respect of breaking stress, elongation at break, compressive set and fatigue.

We claim:

1. An aqueous polymer dispersion comprising rubber particles and polymer particles having a reinforcing action, wherein the rubber particles comprise x % by weight of an aromatic monovinyl compound and y % by weight of an aliphatic conjugated diene having from 4 to 9 carbon atoms in copolymerized form, and x is from 5 to 35 and y is from 65 to 95, and the polymer particles having a reinforcing action comprise from 50 to 90% by weight of a first, hard polymer phase A and from 10 to 50% by weight of a second, soft polymer phase B, where the polymer phase A has a glass transition temperature above 70° C. and comprises from 90 to 100% by weight of an aromatic monovinyl compound and up to 10% by weight of an aliphatic conjugated diene having from 4 to 9 carbon atoms in copolymerized form and the polymer phase B comprises x±3% by weight of the aromatic monovinyl compound present in the rubber particles and y±3% by weight of the aliphatic conjugated diene having from 4 to 9 carbon atoms present in the rubber particles in copolymerized form.

2. The aqueous polymer dispersion as claimed in claim 1, wherein the glass transition temperature of the polymer phase A is ≧90° C.

3. The aqueous polymer dispersion as claimed in claim 1, wherein the aromatic monovinyl compound is styrene and the aliphatic conjugated diene is 1,3-butadiene.

4. The aqueous polymer dispersion as claimed in claim 1 comprising from 1 to 40 parts by weight of polymer particles per 100 parts by weight of rubber particles.

5. A process for preparing an aqueous polymer dispersion as claimed in claim 1, which comprises preparing the rubber particles and the polymer particles in separate reactions by free-radical-initiated aqueous emulsion polymerization and subsequently combining the aqueous polymer dispersions of the rubber particles and of the polymer particles and mixing them homogeneously.

6. The process as claimed in claim 5, further comprising subjecting the combined aqueous polymer dispersion to agglomeration.

7. The process as claimed in claim 6, wherein the agglomeration is pressure agglomeration.

8. A polymer dispersion prepared by the process as claimed in claim 5.

9. A latex foam derived form the polymer dispersion claimed in claim 1.

10. A molded foam article derived from the polymer dispersion claimed in claim 1.

11. The aqueous polymer dispersion claimed in claim 1, wherein x is from 10–30.

12. The polymer dispersion as claimed in claim 1, wherein y is from 70 to 90.

13. The aqueous polymer dispersion claimed in claim 1, wherein $x+y \geq 90$.

14. The aqueous polymer dispersion claimed in claim 1, wherein the difference in the amounts of the aromatic monovinyl compound and the aliphatic conjugated diene compound in the phase B is ±1.5% by weight of the amounts of these compounds present in the rubber particles.

15. The aqueous polymer dispersion claimed in claim 1, wherein the amounts of the aromatic monovinyl compound and conjugated diene compound in the rubber particles is the same as the amounts of the monovinyl compound and the aliphatic conjugated diene compound in the polymer phase B.

16. The aqueous polymer dispersion claimed in claim 1, wherein the polymer particles comprise from 60 to 80% by weight of a first hard polymer phase A and from 20 to 40% by weight of a second soft polymer phase B.

* * * * *